United States Patent
Landry (10) Patent No.: US 9,258,434 B1
(45) Date of Patent: Feb. 9, 2016

(54) USING A MOBILE DEVICE AS AN EXTERNAL MONITOR

(75) Inventor: Shane Jeremy Landry, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1261 days.

(21) Appl. No.: 12/880,684

(22) Filed: Sep. 13, 2010

(51) Int. Cl.
G09G 5/00 (2006.01)
H04N 1/00 (2006.01)

(52) U.S. Cl.
CPC ....... *H04N 1/00148* (2013.01); *H04N 1/00145* (2013.01)

(58) Field of Classification Search
CPC ....... G06F 1/1647; G06F 3/1454; G06F 3/14; G09G 5/14; G09G 2360/18
USPC ...................... 345/1.3, 1.2, 2.1, 2.2
See application file for complete search history.

(56) References Cited

U.S. PATENT DOCUMENTS

| | | | |
|---|---|---|---|
| 6,633,759 B1 | 10/2003 | Kobayashi | |
| 7,778,842 B2* | 8/2010 | Apple et al. | 705/1.1 |
| 8,421,808 B2* | 4/2013 | Ishii et al. | 345/502 |
| 8,908,894 B2* | 12/2014 | Amento | H04K 1/00 381/151 |
| 9,043,827 B1* | 5/2015 | Rapoport | G06F 21/10 380/200 |
| 2002/0198017 A1* | 12/2002 | Babasaki et al. | 455/550 |
| 2005/0111172 A1* | 5/2005 | Wang | 361/680 |
| 2006/0020550 A1* | 1/2006 | Fields | G06F 21/10 705/51 |
| 2007/0260751 A1 | 11/2007 | Meesseman | |
| 2008/0009277 A1 | 1/2008 | Bidwell | |
| 2009/0109468 A1* | 4/2009 | Barclay et al. | 358/1.15 |
| 2009/0182891 A1* | 7/2009 | Jalili et al. | 709/231 |
| 2010/0115458 A1 | 5/2010 | Marano et al. | |
| 2010/0245371 A1* | 9/2010 | Ishii et al. | 345/545 |
| 2010/0274691 A1* | 10/2010 | Hammad et al. | 705/30 |
| 2010/0313250 A1* | 12/2010 | Chow | G06F 17/30899 726/5 |
| 2011/0113121 A1* | 5/2011 | Sarkar | 709/218 |
| 2012/0030584 A1* | 2/2012 | Bian | 715/746 |

* cited by examiner

*Primary Examiner* — Thuy Pardo (57) ABSTRACT

A method, system, and medium are provided for using a mobile device (e.g., a smart phone, personal digital assistant ("PDA"), reading device, cell phone) as a external monitor for a computing device (e.g., a laptop, a desktop personal computer). A mobile device may also be used as an input device for the computing device. For example, a trackball, touch screen, keypad, or other input device on the mobile device may be used to control applications operating on the computing device. The mobile device may send and receive communications at the same time a computing device is utilizing the mobile device's input and output components. The mobile device's battery may be charged while the computing device controls the mobile device's input and output mechanisms.

20 Claims, 5 Drawing Sheets

USING A MOBILE DEVICE AS AN EXTERNAL MONITOR

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative aspect, a way of using a mobile device as an external monitor for a computing device while simultaneously using a mobile device's communication capabilities is provided. The way includes receiving, at a mobile device, a visual content from the computing device that is communicatively coupled to the mobile device through a physical connection. The way also includes communicating the visual content directly to a frame buffer associated with a mobile device's display. The way includes displaying the visual content on the mobile device's display without using image processing capabilities of the mobile device. They way includes simultaneous with displaying the visual content, receiving, at the mobile device, a communication over a radio integrated into the mobile device. The way includes communicating an indication that the communication has been received.

In another aspect, a way of displaying, on a mobile device, content generated by an application running on a computing device is provided. The way includes communicating, from the computing device, a visual content to a mobile device that is communicatively coupled to the computing device. The visual content produces a first graphical user interface when displayed on a mobile device's display. The way includes receiving an input signal from an input device integrated into the mobile device. The way includes changing a second graphical user interface that is displayed on a display associated with the computing device, in response to receiving the input signal. The display is not the mobile device's display.

In a third aspect, a way of using a mobile device as an external monitor for a computing device is provided. The way includes transferring control of content displayed on a mobile device's display from the mobile device to the computing device that is communicatively coupled to the mobile device. The way also includes displaying content received from the computing device on the mobile device's display without using a mobile device's video card to process the content. The way also includes, simultaneous with displaying the content, receiving, at the mobile device, a communication over a radio integrated into the mobile device.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention will be better understood from the detailed description provided below and from the accompanying drawings of various embodiments of the invention. Embodiments of the present invention relate generally to using a mobile device (e.g., a smart phone, personal digital assistant ("PDA"), reading device, cell phone) as a external monitor for a computing device (e.g., a laptop, a desktop personal computer). A mobile device may also be used as an input device for the computing device. For example, a trackball, touch screen, keypad, or other input device on the mobile device may be used to control applications operating on the computing device.

The mobile device may send and receive communications at the same time a computing device is utilizing input and output components of the mobile device. In other words, the mobile device may receive e-mails, text messages, telephone calls, and other communications while the computing device is using the mobile device's display and/or input devices. In one embodiment, the mobile device retakes control of all or part of its display upon receiving a communication. In another embodiment, the mobile device notifies a user that a communication has been received without interrupting the computing device's utilization of the mobile device's display. The mobile device's battery may be charged while the computing device controls the mobile device's input and output mechanisms.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
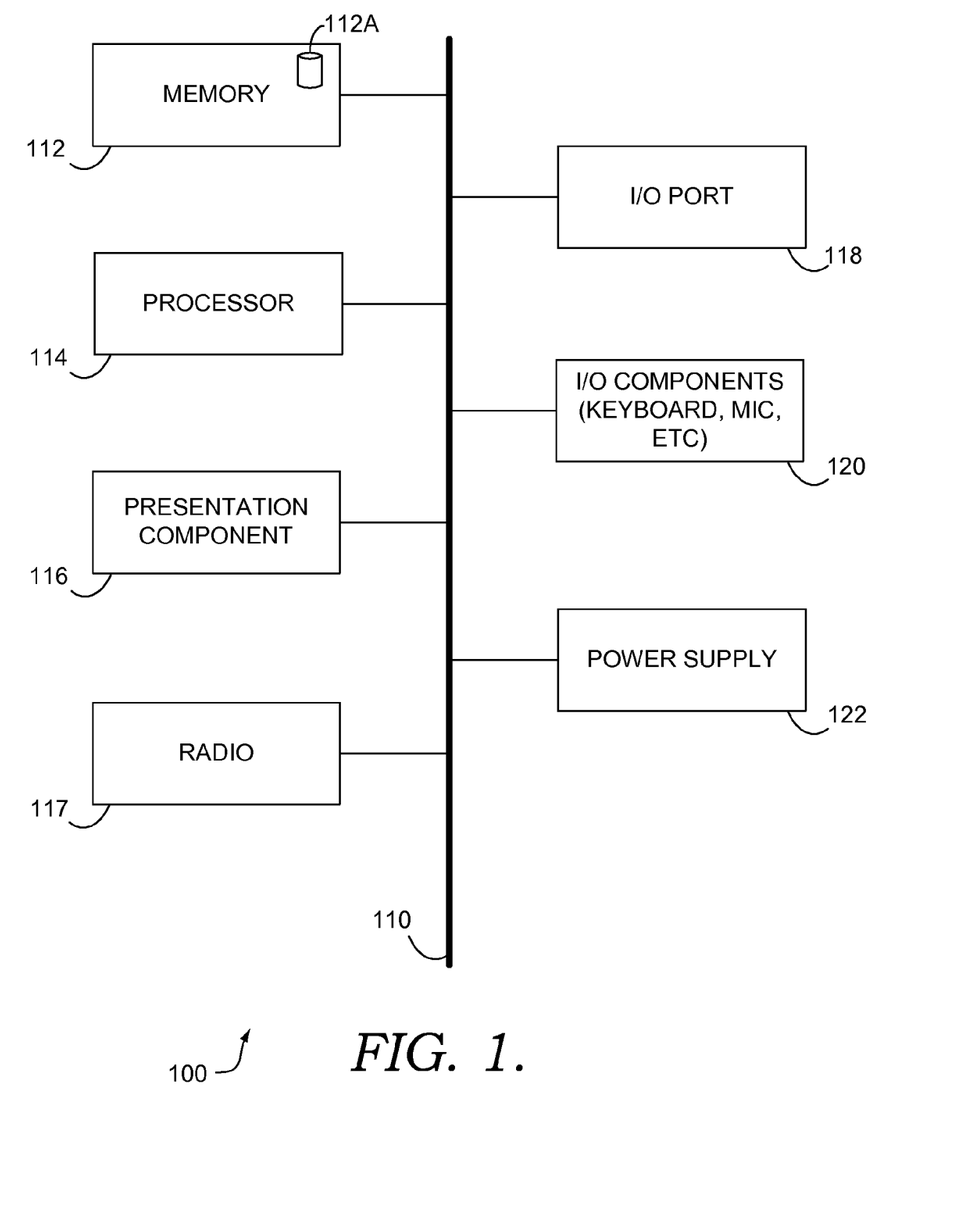
FIG. 1 is a drawing of an illustrative environment in which an embodiment of the present invention operates.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
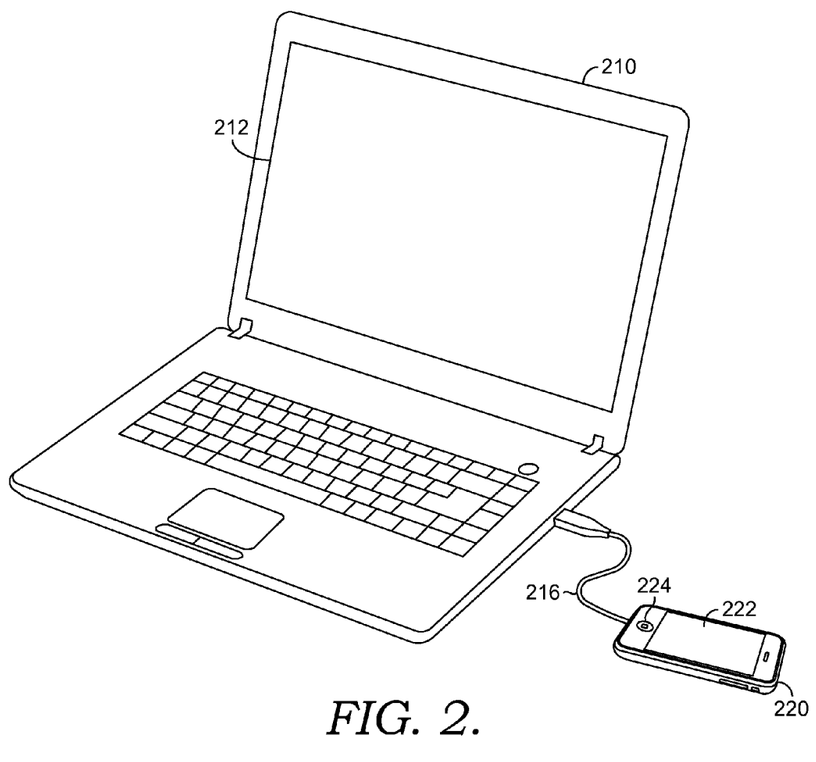
FIG. 2 is a drawing of a computing device coupled to a mobile device, according to an embodiment of the present invention.

Turning now to FIG. 2, a drawing showing a laptop 210 connected to a mobile device 220 by a USB cable 216 is shown, in accordance with an embodiment of the present invention. The laptop 210 includes its own display screen 212. Embodiments of the present invention are not limited to use with a laptop. The laptop 210 is communicatively coupled to the mobile device 220 by a USB cable 216 inserted into a USB socket on the laptop 210. The mobile device 220 includes a display screen 222 and a trackball 224. In one embodiment, display screen 222 is a touch screen. Though not shown, a mobile device may have a keyboard, keypad, camera, accelerometer, GPS receiver, gyroscope, function buttons, microphone, camera, speaker, indicator lights, and other input and output devices.

Embodiments of the present invention allow the laptop 210 to directly control the content displayed on the display screen 222. In addition, input devices, such as trackball 224, may be used to provide input to applications running on the laptop 210. In one embodiment, drivers that control the display 222 on mobile device 220 are installed on the laptop 210 upon detecting the connection of the mobile device 220 to laptop 210. In one embodiment, the drivers for the display 222 and input devices on the mobile device 220 are stored on the mobile device 220 and communicated to the laptop 210 through the USB cable 216 upon connecting the two devices. In another embodiment, the drivers are retrieved from a URL by the laptop 210. In another embodiment, the drivers may be preinstalled on the laptop 210 through a CD ROM, or as part of a series of drivers installed with an operating system or application running on the laptop 210.

Installation of drivers for individual components allows the input and output components on the mobile device 220 to be directly controlled by the laptop 210. A driver is a software program that translates the control signals received from the input device into instructions that are understood by an application or operating system. A driver for an output device receives instructions from an application or operating system and converts them into instructions that are understood by the output device, such as display 222. In one embodiment, output describing visual content is generated by the laptop 210 and sent directly to the frame buffer on mobile device 220 without interfacing with a video card on the mobile device 220. A video card may be one of several components the mobile device 220 uses to process images that are to be presented on the display 222. Embodiments of the present invention allow the laptop 210 to by-pass the mobile device's image processing capabilities and directly control the display 222.

In one embodiment, upon taking control of the display 222 on the mobile device 220 a graphical user interface ("GUI") previously presented on display 212 is snapped to the display 222 on the mobile device 220. Examples of GUIs that may be suitable for snapping include those associated with stock ticker applications, instant messaging applications, and media players. Embodiments of the present invention are not limited to snapping these particular programs to the display 222 on the mobile device 220.

Figure 3:
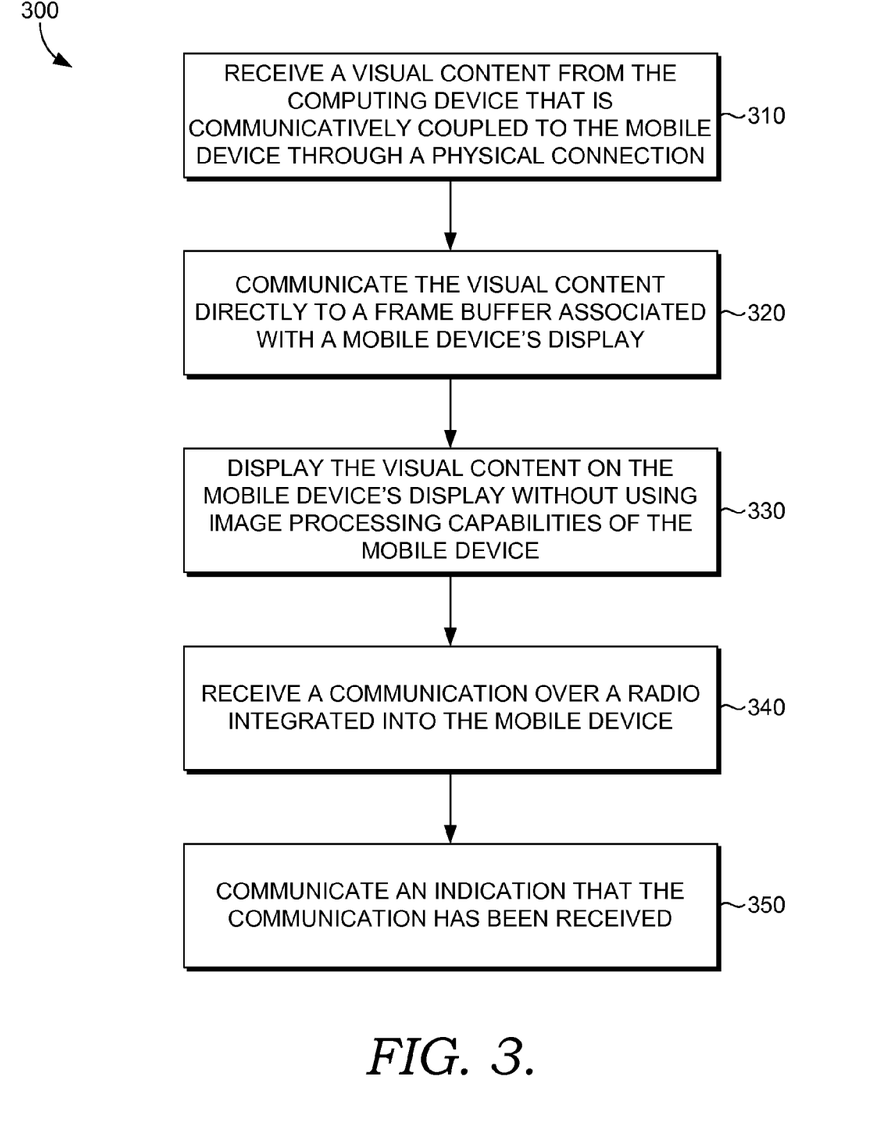
FIG. 3 is a flow diagram of a method of using a mobile device as an external monitor for a computing device while simultaneously using the mobile device's communication capabilities, according to an embodiment of the present invention.

Turning now to FIG. 3, a flowchart describing a method 300 of using a mobile device as an external monitor for a computing device while simultaneously using a mobile device's communication capabilities is shown, in accordance with an embodiment of the present invention. As described previously, the mobile device may be a PDA, smart phone, digital reader, MP3 player, or other similar device. A computing device to which the mobile device is coupled may be a laptop computer, personal computer, tablet computer, or other similar device.

At step 310, a visual content is received at the mobile device from the computing device. The computing device is communicatively coupled to the mobile device through a physical connection. An example of a physical connection is a USB cable. The visual content may be a graphical user interface generated by an application or operating system running on the computing device.

At step 320, the visual content is communicated directly to a frame buffer associated with a mobile device's display. The visual content is not processed by the image processing capabilities of the mobile device. For example the visual content is not processed by a video card associated with the mobile device. At step 330, the visual content is displayed on the mobile device's display without using image processing capabilities of the mobile device. In other words, the computing device, or application associated with the computing device, is directly controlling the display on the mobile device. The mobile device does not alter the visual content as it is received prior to its display on the mobile device's display. A driver for the display may be installed on the computing device to facilitate formatting the visual content into a form that may be consumed by the mobile device's display. As described previously, a driver acts as translator between an application and a hardware component. The driver converts commands or content into a format that may be consumed and understood by the hardware component. Embodiments of the present invention are not limited to the use of a driver to perform these functions.

At step 340, a communication is received at the mobile device over a radio integrated into the mobile device. The communication is received simultaneously with displaying the visual content. The communication may be a telephone call, an e-mail, a text message, an instant message, or some other form of communication. The communication is received using only capabilities embodied on the mobile device. The computing device does not play a role in receiving the communication. This allows the mobile device to loan its display to the computing device while simultaneously maintaining its own communication functions. In one embodiment, the mobile device also receives an electrical current from the computing device for the purpose of charging the mobile device's battery. Thus, the mobile device may receive communications, act as an external monitor, and be charging its battery simultaneously.

At step 350, an indication that the communication has been received is communicated. The indication may be an audible sound, a flashing light, a vibration, or a visual image presented on part or all of the mobile device's display. In one embodiment, the mobile device retakes control of the mobile device's screen upon receiving particular communications. In one embodiment, a governor application runs on a mobile device to switch control of the mobile device's display or other hardware between the mobile device and the computing device.

In addition to acting as an external monitor for the computing device, input controls on the mobile device may be used to control the computing device. Again, drivers for the controls may need to be installed on the computing device to enable the input controls to interact with the applications or operating system running on the computing device. In one embodiment, the touch screen on the mobile device is used to interact with a user interface displayed on the computing device. For example, the touch screen may be used to control the movement of a cursor displayed on a display associated with the computing device. The display associated with the computing device may be a display integrated into a laptop computer or an external monitor. In one embodiment, the computing device makes a video call using a camera, microphone, and speaker on the mobile device. In this example, the mobile device's communication capabilities (e.g., radio, receiver, and related components) are not used as part of the video call. The computing device directly controls the camera, microphone, and speaker. The computing device's communication capabilities are used to communicate the content of the video call.

Figure 4:
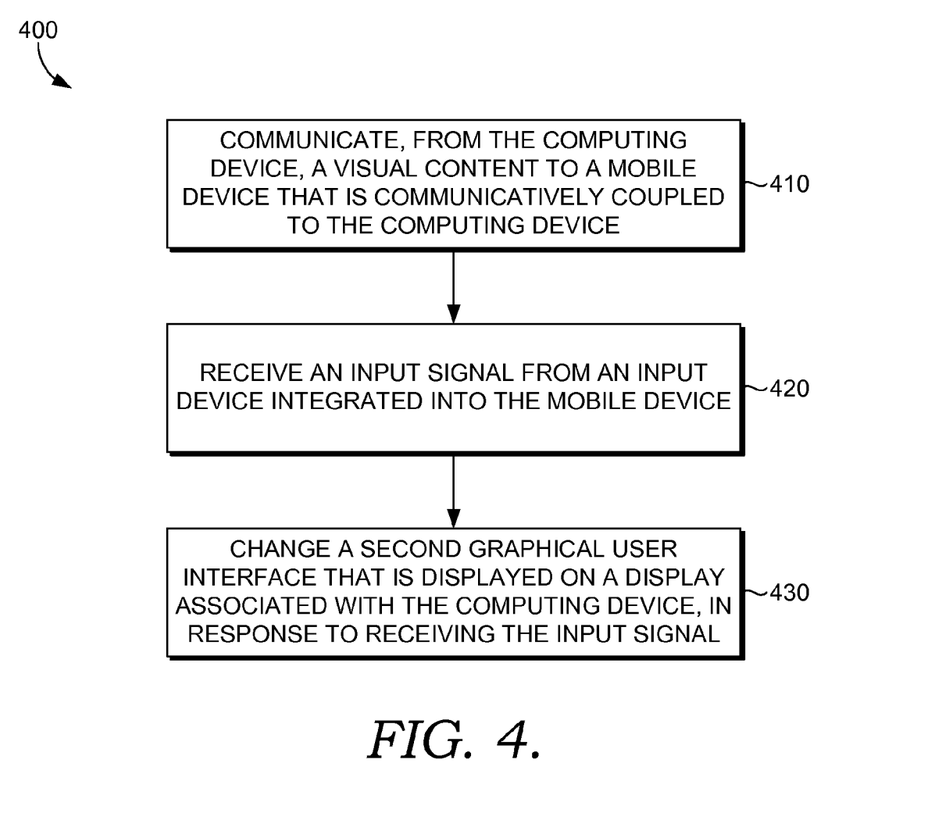
FIG. 4 is a flow diagram of a method of displaying, on a mobile device, content generated by an application running on a computing device, according to an embodiment of the present invention.

Turning now to FIG. 4, a flowchart describing a method 400 of displaying, on a mobile device, content generated by an application running on the computing device is shown, in accordance with an embodiment of the present invention. At step 410, visual content is communicated from the computing device to a mobile device that is communicatively coupled to the computing device. The visual content produces a first graphical user interface when displayed on a mobile device's display. In one embodiment, the first graphical user interface may be moved from the mobile device's display to a second display associated with the computing device. In another embodiment, the graphical user interface may span both the mobile device's display and the second display associated with the computing device. In one embodiment, upon detecting the attachment of the mobile device to the computing device, a graphical user interface associated with an application running on the computing device is automatically snapped to the mobile device's display.

At step 420, an input signal from an input device integrated into the mobile device is received at the computing device. The input device may be a trackball, keyboard, key, button, touch screen, or other input device. The input signal may be the unaltered signal generated by the input control. The computing device may have a driver for the input control that converts the input signal into instructions that may be consumed by an application or operating system.

At step 430, a second graphical user interface that is displayed on a display associated with the computing device is changed in response to receiving the input signal. The display is not to the mobile device's display, but a second display that is associated with the computing device. The change may vary depending on the input device that generated the input signal. For example, strokes on the mobile device's keyboard may cause written letters to be displayed on the second graphical user interface. Input signals generated by a trackball or a touch screen may cause a cursor to move or items to be selected. In one embodiment, the input device is a group of accelerometers within the mobile device. In another embodiment, the input device is a gyroscope. Input from the accelerometers or gyroscope may be used to control a game displayed in the second graphical user interface. Again, drivers installed on the computing device may translate the signals received from these input devices into instructions that may be consumed by a game program that is generating the second graphical user interface.

At the same time the mobile device's display and one or more input controls are being utilized by the computing device, the mobile device may receive communications using its own capabilities. The mobile device may provide an indication that a communication has been received. In one embodiment, the mobile device may charge its battery at the same time the computing device is utilizing its input controls and display.

A mobile device may have a designated input control, such as a button, that discontinues the use of the mobile device's display and input controls by the computing device. In other words, selecting a button on the mobile device will restore all of the mobile device's functionality and deny the computing device access to the mobile device's input and output components. The input from the button may be sent to a governor, which is responsible for transferring control of one or more of the mobile device's components between the computing device and the mobile device. In one embodiment, the user instructs the governor to allow a computing device to utilize the mobile device's input and output components prior to receiving content from the computing device. The mobile device may provide a user interface that allows the user to specify which components the computing device may use and actions the governor should take when a communication is received.

Figure 5:
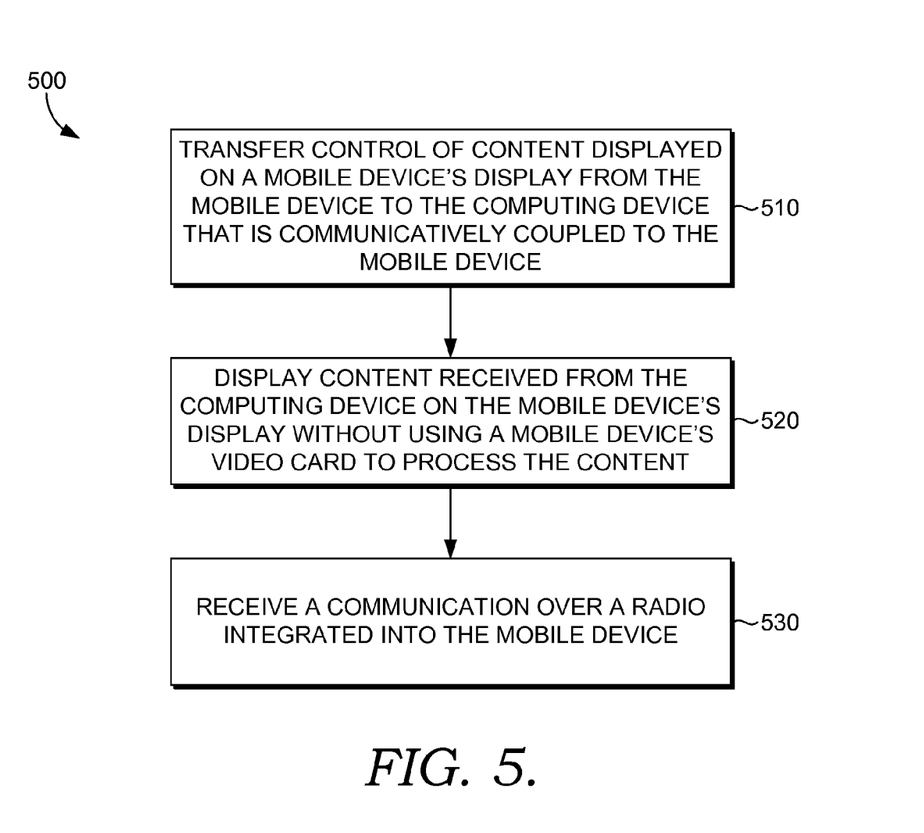
FIG. 5 is a flow diagram of a method of using a mobile device as an external monitor for a computing device, according to an embodiment of the present invention.

Turning now to FIG. 5, a flowchart describing a method 500 of using a mobile device as an external monitor for a computing device is shown, in accordance with an embodiment of the present invention. At step 510, control of content displayed on a mobile device's display is transferred from the mobile device to the computing device that is communicatively coupled to the mobile device. The mobile device may be communicatively coupled to the computing device through a cable. In another embodiment, the mobile device is communicatively coupled to the mobile device wirelessly. The wireless connection may be a Bluetooth connection, Wi-Fi connection, WiMAX connection or other connection suitable for transferring data between the mobile device and the computing device. The control of content displayed on a mobile device may be governed by a governor application running on the mobile device. Transferring control of the display allows the computing device to control the content shown on the mobile device without interfacing with a video card or other application on the mobile device. The mobile device's display may continue to draw power from the mobile device's battery even when being controlled by the computing device. When controlled by the computing device, the visual content may be sent directly to a frame buffer associated with the mobile device's display. The computing device may convert visual content rendered by an application or operating system running on the computing device into a format suitable for consumption by the mobile device's display.

At step 520, visual content received from the computing device is displayed on the mobile device's display without using the mobile device's image processing capabilities to process the content. At step 530, a communication is received by the mobile device over a radio integrated into the mobile device. Step 530 occurs simultaneously with step 520. In other words, the mobile device's display may be controlled by the computing device and be in the process of displaying content provided by the computing device at the same time that the mobile device's communication functions are operating. The mobile device may provide an indication that a communication has been received without interrupting the display of visual content on the mobile device's display. In the alternative, the mobile device may transfer control of the display back to the mobile device from the computing device in order to provide an indication that a communication has been received. Control may be transferred back to the mobile device in order to display communications that have a visual component. Examples of communications that have a visual component include text messages, e-mails, instant messages, and picture messages. Control of input devices integrated into the mobile device may also be transferred to the computing device as described previously. Control of the input devices may be retaken upon receiving a communication or instruction from a user of the mobile device. One or more input devices on the mobile device may be reserved to restore the mobile device's normal functionality and return control of all input and output devices on the mobile device to the mobile device. In one embodiment, the mobile device may charge its battery while being used as an external monitor and while receiving communications.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method of using a mobile device as an external monitor for a computing device while simultaneously using a mobile device's communication capabilities, the method comprising:
    sending a control signal indicating a command to transfer control of a mobile device display associated with the mobile device, wherein the control of the mobile device display is transferred from the mobile device to the computing device that is communicatively coupled to the mobile device through a physical connection;
    receiving, at a frame buffer on the mobile device, a visual content for display at the mobile device display, wherein the visual content has been processed by the computing device, and wherein the visual content is communicated directly from the computing device to the frame buffer on the mobile device, such that the visual content bypasses image processing components including a video card and a display driver on the mobile device;
    displaying the visual content on the mobile device display without using image processing capabilities of the mobile device;
    simultaneous with displaying the visual content, receiving, at the mobile device, a communication over a radio integrated into the mobile device; and
    communicating an indication that the communication has been received.

2. The method of claim 1, wherein the method further comprises detecting that the mobile device is communicatively coupled to the computing device and communicating a driver for the mobile device display to the computing device.

3. The method of claim 1, wherein the method further comprises:
    receiving an input through an input device on the mobile device;
    communicating a signal from the input device to the computing device, wherein the signal describes the input; and
    changing a graphical user interface generated by an application or operating system running on the mobile device based on the signal.

4. The method of claim 3, wherein the input device is one or more of a keyboard, a trackball, a touch screen, and a button.

5. The method of claim 1, wherein the communication is a phone call and the indication is sounding a ring tone.

6. The method of claim 1, wherein the communication is a text message and the indication is a sound.

7. The method of claim 1, wherein the method further comprises receiving an electrical current from the computing device and charging a mobile device's battery while simultaneously displaying the visual content.

8. One or more non-transitory computer-readable media having computer-executable instructions embodied thereon that, when executed by a processor, perform a method of displaying, on a mobile device, content generated by an application running on a computing device, the method comprising:
    receiving a first control signal indicating a first command to transfer control of a mobile device display associated with the mobile device from the mobile device to the computing device that is communicatively coupled to the mobile device;
    at the computing device, utilizing a driver associated with the mobile device display to process a visual content for display at the mobile device display, wherein the driver converts the visual content into a format suitable for a frame buffer on the mobile device that is utilized by the mobile device display;
    subsequent to processing the visual content, communicating the processed visual content to the mobile device, wherein the converted visual content suitable for the frame buffer is communicated directly to the frame buffer on utilized by the mobile device display, wherein the converted visual content bypasses a display driver on the mobile device that is associated with the mobile device display, wherein the processed visual content produces a first graphical user interface when displayed at the mobile device display;
    receiving an input signal from an input device integrated into the mobile device, wherein the received input signal is an unaltered signal generated by the input device;
    utilizing a driver associated with the mobile device's input device to convert the unaltered signal from the input device into instructions that are compatible with an application running on the computing device; and
    changing a second graphical user interface that is displayed on a display associated with the computing device, in response to utilizing the instructions converted from the unaltered signal, wherein the display associated with the computing device is different from the mobile device display.

9. The media of claim 8, wherein the first graphical user interface may be moved between the display associated with the computing device and the mobile device display.

10. The media of claim 8, wherein the first graphical user interface may span both the display associated with the computing device and the mobile device display.

11. The media of claim 8, wherein the first graphical user interface is automatically snapped to the mobile device display upon detecting that the mobile device is communicatively coupled to the computing device.

12. The media of claim 11, wherein the first graphical user interface displays a stock ticker and is generated by the application operating on the computing device.

13. The media of claim 8, wherein the method further comprises receiving a second control signal indicating a second command to transfer the control of the mobile device display from the computing device to the mobile device.

14. The media of claim 8, wherein the input device is a touch screen.

15. One or more non-transitory computer-readable media having computer-executable instructions embodied thereon that, when executed by a processor, perform a method of using a mobile device, which includes a mobile device display, as an external monitor for a computing device, the method comprising:

sending a first control signal indicating a first command to transfer control of a content displayed at the mobile device, wherein the control is transferred from the mobile device to the computing device that is communicatively coupled to the mobile device;

transferring the control of the content displayed at the mobile device from the mobile device to the computing device;

receiving at a frame buffer on the mobile device a processed content from the computing device and displaying the processed content at the mobile device, wherein the processed content has been processed by the computing device into a format usable by the frame buffer on the mobile device and bypasses image processing components including a video card and a display driver on the mobile device, such that the processed content is displayed at the mobile device without using the video card and the display driver to process the content; and simultaneous with displaying the processed content, receiving, at the mobile device, a communication over a radio integrated into the mobile device.

16. The media of claim 15, wherein the method further comprises transferring input data generated by an input device on the mobile device directly to the computing device without transforming the input data using a driver associated with the input device.

17. The media of claim 16, wherein the input device is one or more of a keyboard, a trackball, a touch screen, and a button.

18. The media of claim 15, wherein the method further comprises, subsequent to the receiving of the communication, sending a second control signal indicating a second command to transfer the control of the content displayed at the mobile device from the computing device to the mobile device.

19. The media of claim 15, wherein the communication is one or more of a phone call, text message, email, and photo message.

20. The media of claim 15, wherein the method further comprises receiving an electrical current from the computing device and charging a mobile device's battery while simultaneously displaying said content.

\* \* \* \* \*